United States Patent
Lodhi et al.

(10) Patent No.: US 11,526,168 B2
(45) Date of Patent: Dec. 13, 2022

(54) ROBOTIC INSPECTION OF IN-SERVICE TANKS THROUGH LOWER WALL

(71) Applicant: Saudi Arabian Oil Company, Dhahran (SA)

(72) Inventors: Zeeshan Farooq Lodhi, Dhahran (SA); Mir Asif Khan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 506 days.

(21) Appl. No.: 16/683,936

(22) Filed: Nov. 14, 2019

(65) Prior Publication Data

US 2021/0149399 A1  May 20, 2021

(51) Int. Cl.
*G05D 1/00* (2006.01)
*G01M 5/00* (2006.01)
*G01B 7/06* (2006.01)
*G01B 17/02* (2006.01)

(52) U.S. Cl.
CPC ........ *G05D 1/0094* (2013.01); *G01M 5/0033* (2013.01); *G05D 1/0088* (2013.01); *G01B 7/10* (2013.01); *G01B 17/02* (2013.01); *G05D 2201/0207* (2013.01)

(58) Field of Classification Search
None
See application file for complete search history.

(56) References Cited

U.S. PATENT DOCUMENTS

| | | | |
|---|---|---|---|
| 4,722,142 A | 2/1988 | Schmidt | |
| 5,343,146 A | 8/1994 | Koch et al. | |
| 9,726,569 B2 | 8/2017 | Koyanagi | |
| 9,739,721 B2 | 8/2017 | Gutierrez Perez et al. | |
| 9,753,461 B1 | 9/2017 | Johnson et al. | |
| 10,030,803 B2 | 7/2018 | Choi et al. | |

(Continued)

FOREIGN PATENT DOCUMENTS

| | | |
|---|---|---|
| CN | 106123956 | 11/2016 |
| CN | 106548469 | 3/2017 |

(Continued)

OTHER PUBLICATIONS

A.Hak Industrial Services [online], "Online Robotic Tank Bottom Inspection," retrieved on Oct. 14, 2019, from URL: <http://www.a-hak-is.com/en/home/what_we_do/markets/tank storage/integrated_tank_services/inspection/online_robotic_tank_bottom_inspection> 2 pages.

(Continued)

*Primary Examiner* — Raul J Rios Russo
*Assistant Examiner* — Carl F. R. Tchatchouang
(74) *Attorney, Agent, or Firm* — Fish & Richardson P.C.

(57) ABSTRACT

To implement robotic inspection of an in-service tank through the lower wall, a launch system is operatively coupled to the in-service tank carrying a multiphase fluid separated into a first fluid phase settled at the bottom of the in-service tank and a second fluid phase floating above the first fluid phase. The launch system includes multiple valves and is coupled to the bottom of the in-service tank. By operating the launch system, a robotic tank inspection device is introduced into the first fluid phase in the in-service tank while bypassing the second fluid phase. By operating the robotic tank inspection device, the bottom of the in-service tank is inspected for corrosion.

16 Claims, 15 Drawing Sheets

(56) References Cited

U.S. PATENT DOCUMENTS

| | | | |
|---|---|---|---|
| 10,132,713 | B2 | 11/2018 | Choi et al. |
| 11,087,895 | B2 * | 8/2021 | Cole ................ G01N 9/08 |
| 2002/0190682 | A1 | 12/2002 | Schempf et al. |
| 2010/0180672 | A1 | 7/2010 | Zollinger |
| 2012/0256643 | A1 | 10/2012 | Langley et al. |
| 2013/0294677 | A1 | 11/2013 | Urano et al. |
| 2017/0366868 | A1 | 12/2017 | Otsuka |
| 2019/0139215 | A1 | 5/2019 | Starr et al. |
| 2021/0131604 | A1 | 5/2021 | Hajri et al. |

FOREIGN PATENT DOCUMENTS

| | | | |
|---|---|---|---|
| CN | 107483835 | 12/2017 | |
| CN | 107607465 | 1/2018 | |
| CN | 107807171 | 3/2018 | |
| CN | 108680644 | 10/2018 | |
| CN | 109035202 | 12/2018 | |
| CN | 109459377 | 3/2019 | |
| CN | 109490831 | 3/2019 | |
| EP | 2062659 | 5/2009 | |
| EP | 2062659 A2 * | 5/2009 | ............ B05B 12/00 |
| WO | WO 0111317 | 2/2001 | |
| WO | WO 2004029564 | 4/2004 | |
| WO | WO-2004029564 A1 * | 4/2004 | ........... G01N 29/225 |
| WO | WO 2018104790 | 6/2018 | |
| WO | WO 2019035856 | 2/2019 | |

OTHER PUBLICATIONS

Anvo et al., "Non-destructive testing robots (NDTBOTs) for in-service storage tank inspection," Journal of Mechanics Engineering and Automation, 8, pp. 103-109, Mar. 2018, 7 pages.

Square Robot [online], "Robotic Inspection of In-Service Diesel Storage Tank a Success," Published May 2019, retrieved Oct. 14, 2019, from URL: <http://squarerobots.com/news/pr-2019-05-29.html> 4 pages.

PCT International Search Report and Written Opinion in International Appln. No. PCT/US2020/059956, dated Feb. 18, 2021, 16 pages.

PCT Invitation to Pay Additional Fees and, Where Applicable, Protest Fee in International Appln. No. PCT/US2020/059053, dated Feb. 4, 2021.

Espinoza et al., "Navigation's Stabilization System of a Magnetic Adherence-Based Climbing Robot," Journal of Intelligent and Robotic Systems, Jul. 2014, 78(1): 65-81, XP035470751, 17 pages.

Mao et al., "Signal processing and defect analysis of pipeline inspection applying magnetic flux leakage methods," Intelligent Service Robotics, Springer Berlin Heidelberg, Aug. 2014, 7(4): 203-209, XP035395081, 7 pages.

Stanley, "Recent advances in robotic coiled tubular assessment," Insight—Non-destructive Testing and Condition Monitoring, Sep. 2007, 49(9): 524-531, XP055768545, 8 pages.

Tao et al., "Development of magnetic flux leakage pipe inspection robot using hall sensors," Micro-Nanomechatronics and Human Science, 2004 and the Forth Symposium Micro-Nanomechatronics for Information-Based Society, Proceedings of the 2004 International Symposium on Nagoya, Japan, Oct. 31-Nov. 3, 2004, XP010785963, 1-5, 5 pages.

PCT International Search Report and Written Opinion in International Appln. No. PCT/US2020/059053, dated Apr. 1, 2021, 22 pages.

Song et al., "Design of in-pipe robot based on inertial positioning and visual detection," Advances in Mechanical Engineering, Sep. 2016, XP055786930, 8(9) 1-22, 22 pages.

GCC Examination Report in Gulf Cooperation Council Appln. No. GC 2020-40816, dated Oct. 29, 2021, 3 pages.

GCC Examination Report in Gulf Cooperation Council Appln. No. GC 2020-40889, dated Oct. 31, 2021, 3 pages.

* cited by examiner

ROBOTIC INSPECTION OF IN-SERVICE TANKS THROUGH LOWER WALL

TECHNICAL FIELD

This disclosure relates to servicing tanks that carry fluids, for example, multiphase fluids such as hydrocarbons.

BACKGROUND

An in-service tank is a storage tank that has been placed in service and contains stored fluid. Certain storage tanks store multiphase hydrocarbons with water phase at the bottom and the hydrocarbon phase at the top. An in-service storage tank is in operation. Inspecting an in-service storage tank does not require emptying the tank. Inspecting the bottom plate of an in-service storage tank can be challenging.

SUMMARY

This disclosures describes technologies relating to robotic inspection of in-service tanks through lower wall.

Certain aspects of the subject matter described here can be implemented as a method. A launch system is operatively coupled to an in-service tank carrying a multiphase fluid separated into a first fluid phase settled at the bottom of the in-service tank and a second fluid phase floating above the first fluid phase. The launch system includes multiple valves and is coupled to the bottom of the in-service tank. By operating the launch system, a robotic tank inspection device is introduced into the first fluid phase in the in-service tank while bypassing the second fluid phase. By operating the robotic tank inspection device, the bottom of the in-service tank is inspected for corrosion.

An aspect combinable with any other aspect includes the following features. The first fluid phase occupies a volume within the in-service tank. The robotic tank inspection device is introduced directly into the volume occupied by the first fluid phase while avoiding a remaining volume within the in-service tank.

An aspect combinable with any other aspect includes the following features. The launch system includes a nozzle attached to the bottom of the in-service tank. The nozzle is directly coupled to the volume occupied by the first fluid phase. The robotic tank inspection device is introduced directly into the volume through the nozzle.

An aspect combinable with any other aspect includes the following features. The launch system includes multiple flow pathways fluidically coupled to the multiple valves. The robotic tank inspection device is introduced into the first fluid phase through the nozzle by operating the multiple valves to regulate fluid flow through the multiple flow pathways.

An aspect combinable with any other aspect includes the following features. To avoid the remaining volume of the in-service tank, contact between the robotic tank inspection device and the second fluid phase is avoided when introducing the robotic tank inspection device into the first fluid phase.

An aspect combinable with any other aspect includes the following features. When inspecting the bottom of the in-service tank, the robotic tank inspection device avoids contact with the second fluid phase.

An aspect combinable with any other aspect includes the following features. By operating the launch system, the robotic tank inspection device is retrieved from the in-service tank from the first fluid phase while bypassing the second fluid phase.

An aspect combinable with any other aspect includes the following features. When retrieving the robotic tank inspection device, contact between the robotic tank inspection device and the second fluid phase is avoided.

Certain aspects of the subject matter described here can be implemented as a method. A multiphase fluid is stored in an in-service tank that includes an internal bottom surface. The multi-phase fluid includes a non-flammable first fluid phase and a flammable second fluid phase immiscible with the first fluid phase. The first fluid phase settles to the internal bottom surface of the in-service tank. A robotic tank inspection device is introduced directly into a portion within the in-service tank in which the first fluid phase and no second fluid phase resides. The internal bottom surface is autonomously inspected, by the robotic tank inspection device for corrosion while residing in the portion of the in-service tank.

An aspect combinable with any other aspect includes the following features. The launch system is fluidically coupled to the portion of the in-service tank. The launch system includes a nozzle, multiple flow pathways fluidically coupled to the nozzle, and multiple valves to regulate fluid flow through the multiple flow pathways to the portion of the in-service tank. The robotic tank inspection device is introduced directly into the portion through the nozzle.

An aspect combinable with any other aspect includes the following features. A side wall connects the internal bottom surface of the in-service tank to a roof of the in-service tank. The nozzle is coupled to the side wall nearer to the internal bottom surface than to the roof.

An aspect combinable with any other aspect includes the following features. A portion of the nozzle extending within the in-service tank resides entirely within the first fluid phase.

An aspect combinable with any other aspect includes the following features. Contact between the robotic tank inspection device and the second fluid phase is avoided when introducing the robotic tank inspection device into the in-service tank.

An aspect combinable with any other aspect includes the following features. The contact is avoided when the robotic tank inspection device autonomously inspects the in-service tank bottom.

An aspect combinable with any other aspect includes the following features. After completion of inspection, the robotic tank inspection device is retrieved from within the in-service tank. The contact is avoided when retrieving the robotic tank inspection device.

Certain aspects of the subject matter described here can be implemented as a method. An in-service tank includes an internal bottom surface, a side wall, and a roof. The in-service tank carries the first fluid phase and a second fluid phase immiscible with the first fluid phase. The in-service tank defines an internal volume including a first volume portion nearer the internal bottom surface than the roof and a second volume portion nearer the roof than the internal bottom surface. The first fluid phase and no second fluid phase occupies the first volume portion. The second fluid phase and no first fluid phase occupies the second volume portion. In the in-service tank, a robotic tank inspection device is introduced directly into the first volume portion while avoiding the second volume portion. The robotic tank inspection device is operated in the first volume portion to inspect the internal bottom surface for corrosion.

An aspect combinable with any other aspect can include the following features. When introducing the robotic tank inspection device directly into the first volume portion, contact between the second fluid phase and the robotic tank inspection device is prevented.

An aspect combinable with any other aspect can include the following features. When operating the robotic tank inspection device in the first volume portion, contact between the second fluid phase and the robotic tank inspection device is prevented.

An aspect combinable with any other aspect can include the following features. After completion of inspection, the robotic tank inspection device is retrieved from within the in-service tank while avoiding the second volume portion.

An aspect combinable with any other aspect can include the following features. When retrieving the robotic tank inspection device, contact between the second fluid phase and the robotic tank inspection device is avoided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
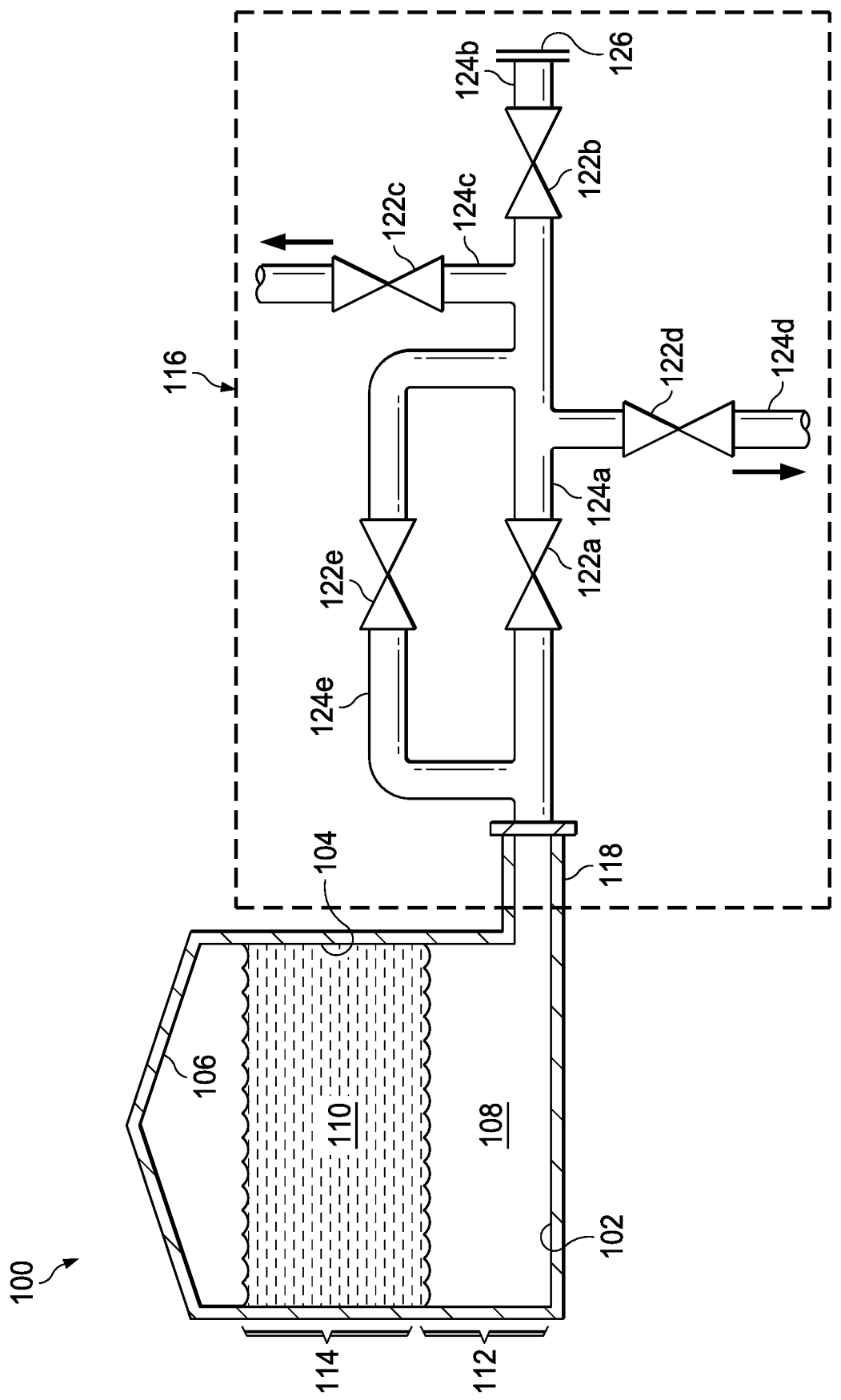
FIG. 1A is a schematic drawing of a in-service tank connected to a launch system through a robotic tank inspection device can be introduced into the tank.

Internal inspection of tanks, for example, tanks carrying multiphase hydrocarbons, is carried out to inspect the bottom plates of the tanks either due to presence of corrosive settled medium or soil-side corrosion. A multiphase hydrocarbon includes a first fluid phase, for example, a water phase, and a second fluid phase, for example, an oil phase, that is immiscible with the first fluid phase. Because water is heavier than oil, the water phase collects at the bottom of the tank and can be periodically flushed out partially to enhance the product or crude oil quality and partially to overcome corrosion issues. While the tank is in service, the tank bottom plate (that is, the internal bottom surface of the tank) cannot be reached externally for inspection by any nondestructive examination (NDE) technologies. Consequently, uncertainty is associated with the integrity and safety of the tank. A breach in the integrity of the internal bottom surface of the tank can result in a plant shutdown and expensive downtime.

One technique to inspect the internal bottom surface of an in-service tank is to introduce a robotic tank inspection device, for example, a robotic crawler or a remote operating vehicle (ROV) through the roof of the in-service tank into the oil phase and past the water phase. However, the presence of charged batteries in the robotic tank inspection device increases the risk of fire and explosion upon contacting the oil phase of the hydrocarbons.

This disclosure describes techniques to introduce the robotic tank inspection device directly into the water phase while avoiding the oil phase. To do so, in some implementations, a launch system (described later) that includes multiple valves is operatively coupled to the in-service tank that carries the multiphase hydrocarbons. In particular, the launch system is coupled to the bottom of the in-service tank. By operating the launch system, the robotic tank inspection device is introduced into the water phase in the in-service tank while bypassing the oil phase. The robotic tank inspection device is operated (either by an operator or autonomously) to inspect the bottom of the in-service tank for corrosion or other defects.

Implementing the techniques described in this disclosure can minimize or eliminate the risk of explosion or fire that can result from the charged batteries of the robotic tank inspection device contacting the volatile and flammable hydrocarbons in the oil phase. The techniques allow direct insertion of the robotic tank inspection device into the water phase. Safety and inspection issues can be addressed by operating the robotic tank inspection device to test the in-service tank integrity enabling a comprehensive non-intrusive inspection. The operational availability of the in-service tank can be extended and downtime can be minimized. The inspection technique can assist in finding metal loss, corrosion issues, physical damages and the like with the storage tank bottoms in a timely manner and avoid unexpected loss of containment.

FIG. 1A is a schematic drawing of a in-service tank connected to a launch system through a robotic tank inspection device can be introduced into the tank. The in-service tank 100 includes an internal bottom surface 102, a side wall 104, and a roof 106 attached to each other to define an internal volume. While in-service, the in-service tank 100 receives and carries the multiphase fluid that includes the first fluid phase 108 (that is, the water phase) and the second fluid phase 110 (that is, the hydrocarbon phase) that is immiscible with and floats about the first fluid phase 108. After the first fluid phase 108 has settled to the bottom of the in-service tank 100, the first fluid phase 108 occupies a first volume portion 112 of the in-service tank 100 and the second fluid phase 110 occupies a second volume portion 114 of the in-service tank 100 vertically above the first volume portion 112.

A launch system 116 is operatively coupled to the in-service tank 100. In some implementations, the launch system 116 is a permanent part of the outlet piping design. In some implementations, the launch system 116 need not be a permanent part of the tank design. Instead, the launch system can be attached to the tank as a mobile launch system 117 (FIG. 4) through nozzle 119*a* (FIG. 4) on the storage tank described later and with reference to FIG. 4.

The launch system 116 includes multiple valves and flow pathways (described later) which an operator can operate to introduce a robotic tank inspection device 120 directly into the first fluid phase 108 and on to the internal bottom surface 102 of the in-service tank 100. For example, the straight run fluid flow pathway between tank nozzle 118 to the end blind 126 is a pipe having a diameter that is large enough to receive and transport the robotic tank inspection device 120 into and out of the in-service tank 100. The valves installed in this main pathway (for example, valves 122*a* and 122*b*)

are full bore ball valves with bore size big enough to allow the robotic tank inspection device 120 to be driven through. The diameter of main pathway 124a and 124b pipes and valves can be selected to be in accordance with the size of the robotic tank inspection device 120. Pathways 124c, 124d and 124e and associated valves 122c, 122d and 122e can be smaller sizes as required for the operation. Pathway 124e is an equalization line to equalize the pressure across valve 122a which allows easier operation of valve 122a and also facilitates movement of the robotic tank inspection device 120 in the main pathway. Pathway 124d and Valve 122d are installed as a drain line to remove the water from the main pathway 124a. Pathway 124b is the location for launching and retrieving the robotic tank inspection device 120. Pathway 124c is used for taking the line back in service by opening valve 122c after the tank inspection is complete and the robotic tank inspection device 120 has been retrieved. By introducing the robotic tank inspection device 120 directly into the first fluid phase 108 and by avoiding contact, that is, physical contact between the robotic tank inspection device 120 and the second fluid phase 110, the risk of explosion and fire in the in-service tank 100 as well as damage to the robotic tank inspection device 120 can be minimized or eliminated.

The launch system 116 includes a nozzle 118 that fluidically connects the internal volume of the in-service tank 100 to the outlet piping of the in-service tank 100 through multiple valves and flow pathways. In some implementations, the nozzle 118 can be implemented as a pipe or elongated tubular member having an internal diameter and an axial length that is large enough to receive the robotic tank inspection device 120. The nozzle serves as a connection point on the main storage tank to connect to the associated piping or pathways (or both). Reduction of pressure in the nozzle is not relevant. The nozzle 118 is part of the storage tank and is located at the bottom most end of the side wall 104 for storage tank 100. A piping network maybe attached to this nozzle as outlet. The nozzle 118 is fixedly attached to the side wall 104 of the in-service tank 100 such that there is direct fluid communication from the internal volume of the in-service tank 100 to the nozzle 118. In some implementations, a bottom wall of the nozzle 118 and internal bottom surface 102 of the in-service tank 100 are substantially coplanar. Such an arrangement allows the robotic tank inspection device 120 to contact the internal bottom surface 102 of the in-service tank 100 almost immediately upon being introduced into the in-service tank 100. Also, the arrangement allows the robotic tank inspection device 120 to be directly introduced into the first fluid phase 108 while avoiding any contact with the second fluid phase 110.

Figure 1B:
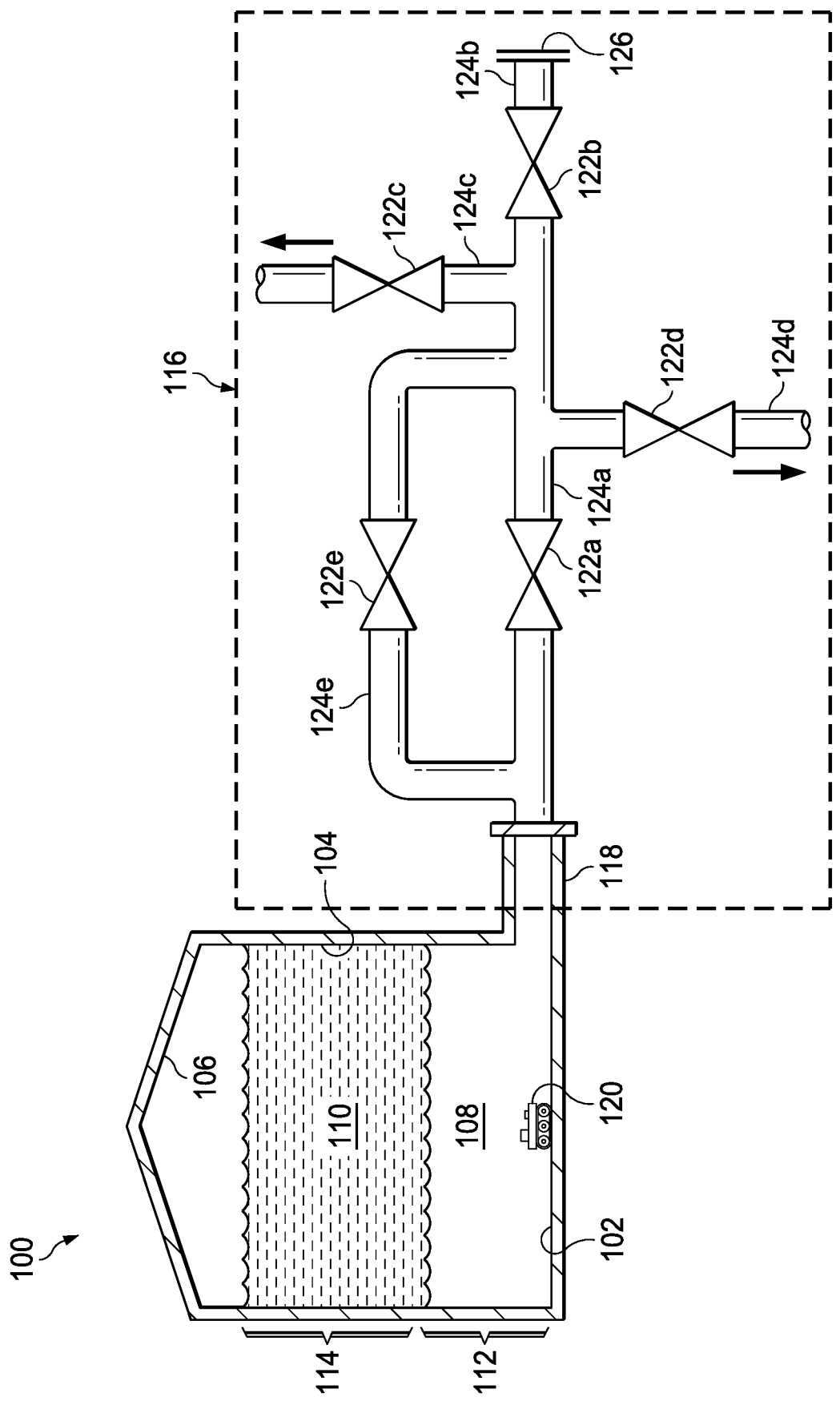
FIG. 1B is a schematic drawing of the robotic tank inspection device after being introduced into the in-service tank.

The schematic drawing shown in FIG. 1A shows the launch system 116 operated to move the robotic tank inspection device 120 into the nozzle 118 immediately outside and adjacent to the first volume portion 112 that carries the first fluid phase 108. FIG. 1B is a schematic drawing of the robotic tank inspection device 120 after being introduced into the in-service tank 100 by operation of the launch system 116. Certain implementations of introducing the robotic tank inspection device 120 into the in-service tank 100 and retrieving the robotic tank inspection device 120 out of the in-service tank 100 while ensuring that the robotic tank inspection device 120 does not contact the second fluid phase 110 are described below with reference to FIGS. 2A-2K. The opening and closing of the multiple valves described with reference to FIGS. 2A-2K can be implemented manually by an operator or automatically by a controller (not shown). For example, the controller can be implemented as a computer system that includes one or more processors and one or more computer-readable media storing computer instructions executable by the one or more processors to operate components of the launch system 116, for example, to open or close the multiple valves or other components, in sequences described with reference to FIGS. 2A-2K.

Figure 2A:
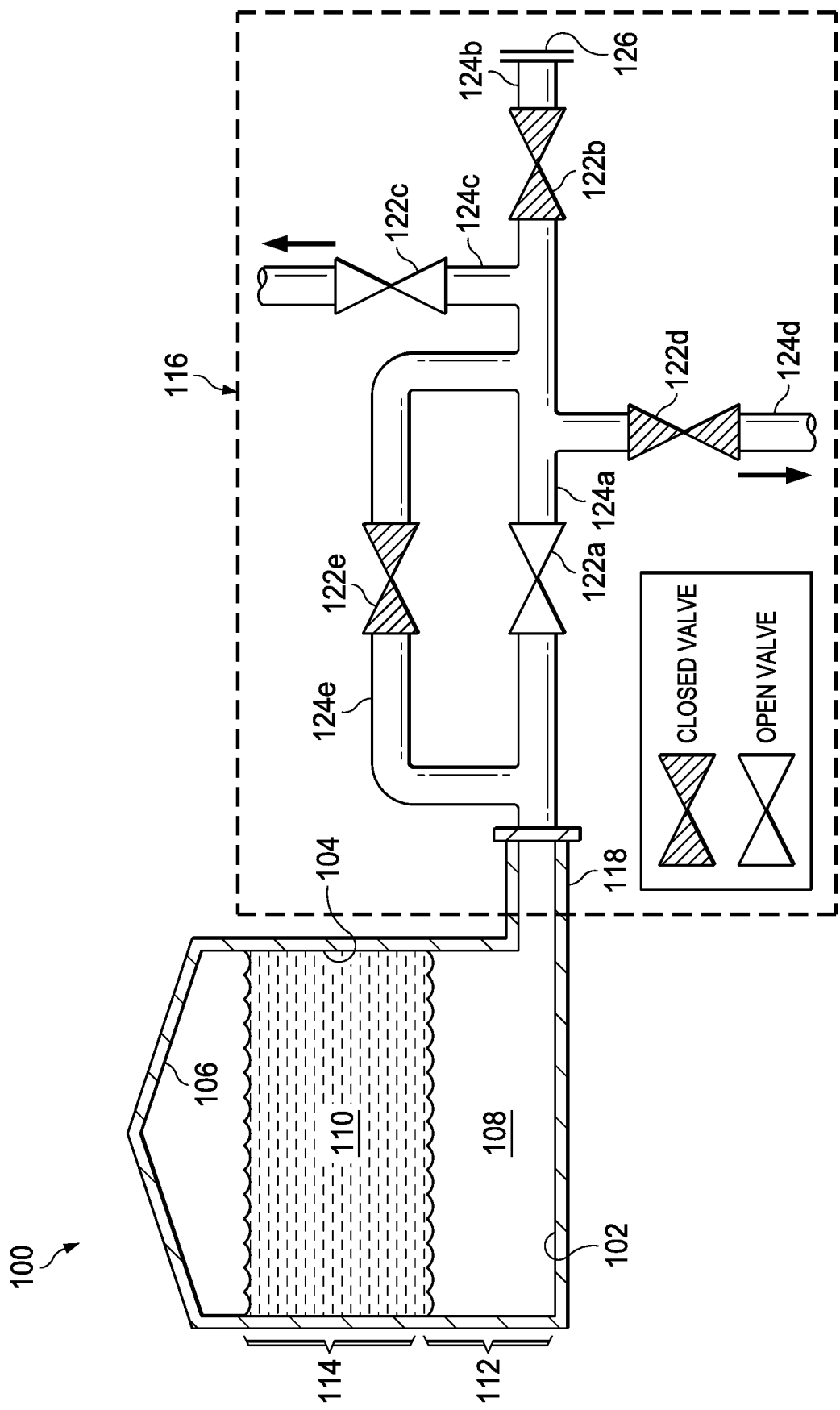
FIGS. 2A-2K are schematic drawings, each showing a state of the launch system to launch the robotic tank inspection device into the in-service tank.

FIGS. 2A-2K are schematic drawings, each showing a state of the launch system 116 to launch the robotic tank inspection device 120 into the in-service tank 100. FIG. 2A shows a normal operational configuration in which a robotic tank inspection device 120 is not introduced into the in-service tank 100. In this configuration, the valve 122a and the valve 122c are open to allow the first fluid phase 108 to flow through the fluid flow pathway 124a and the fluid flow pathway 124c towards an outlet. In this configuration, the first fluid phase 108 can be drained from the in-service tank 100. Also, in this configuration, the valve 122b fluidically coupled to the fluid flow pathway 124b through which the robotic tank inspection device 120 is introduced into the in-service tank 100, the valve 122d fluidically coupled to the fluid flow pathway 124d through which the first fluid phase 108 is drained and the valve 122e fluidically coupled to the equalization line 124e (described later) are closed.

Figure 2B:
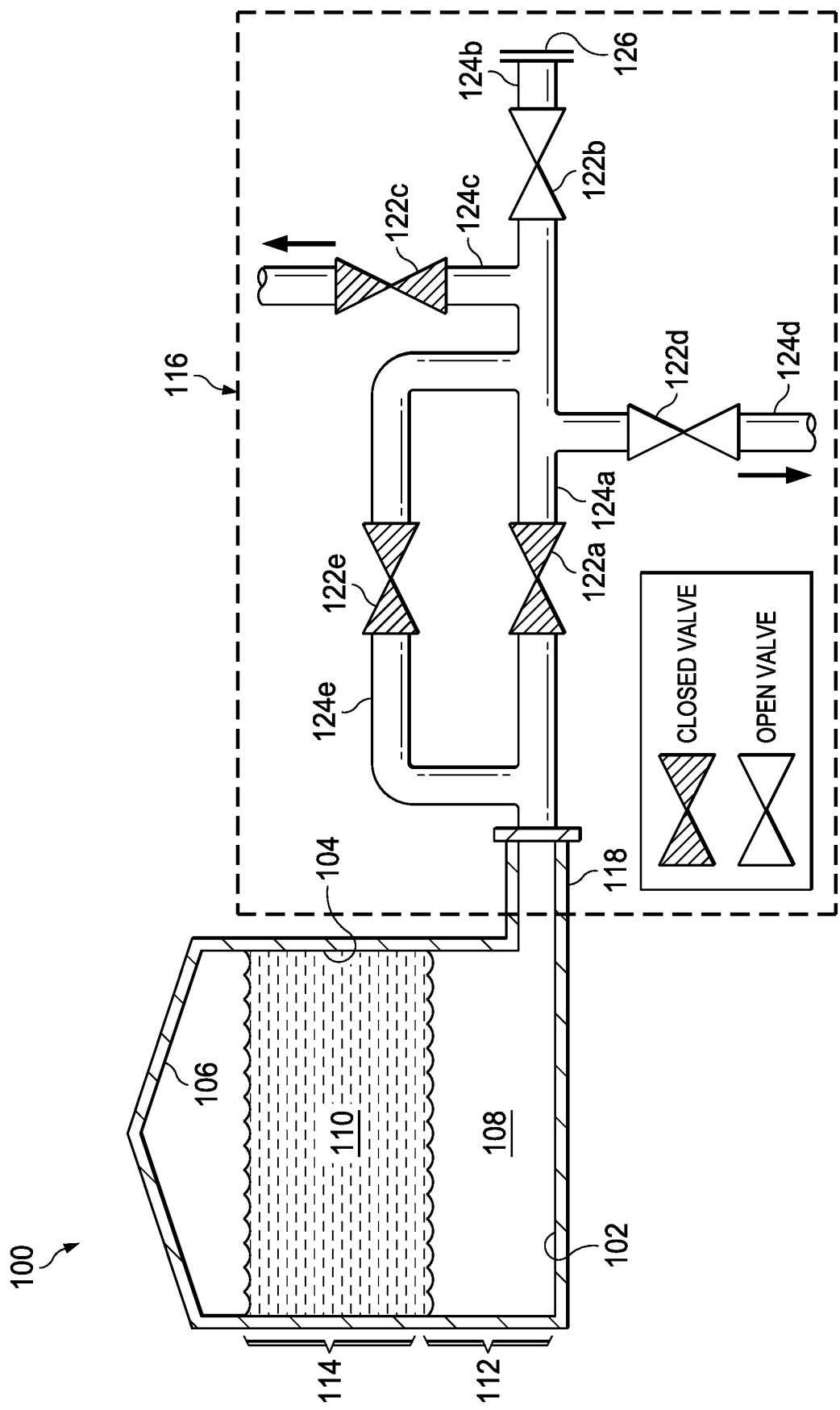

FIG. 2B shows a configuration in which the first fluid phase 108 is drained from some portions of the fluid flow pathways. In this configuration, the valves 122a and 122c are changed from the open states described with reference to FIG. 2A to closed states. The valve 122d is changed from the closed state to the open state. The first fluid phase 108 in the portion of the fluid flow pathways between the valves 122a, 122b, 122c, and 122e drains through the fluid flow pathway 124d. The robotic tank inspection device 120 can then be inserted into the fluid flow pathway 124a, which is now fluid free.

Figure 2C:
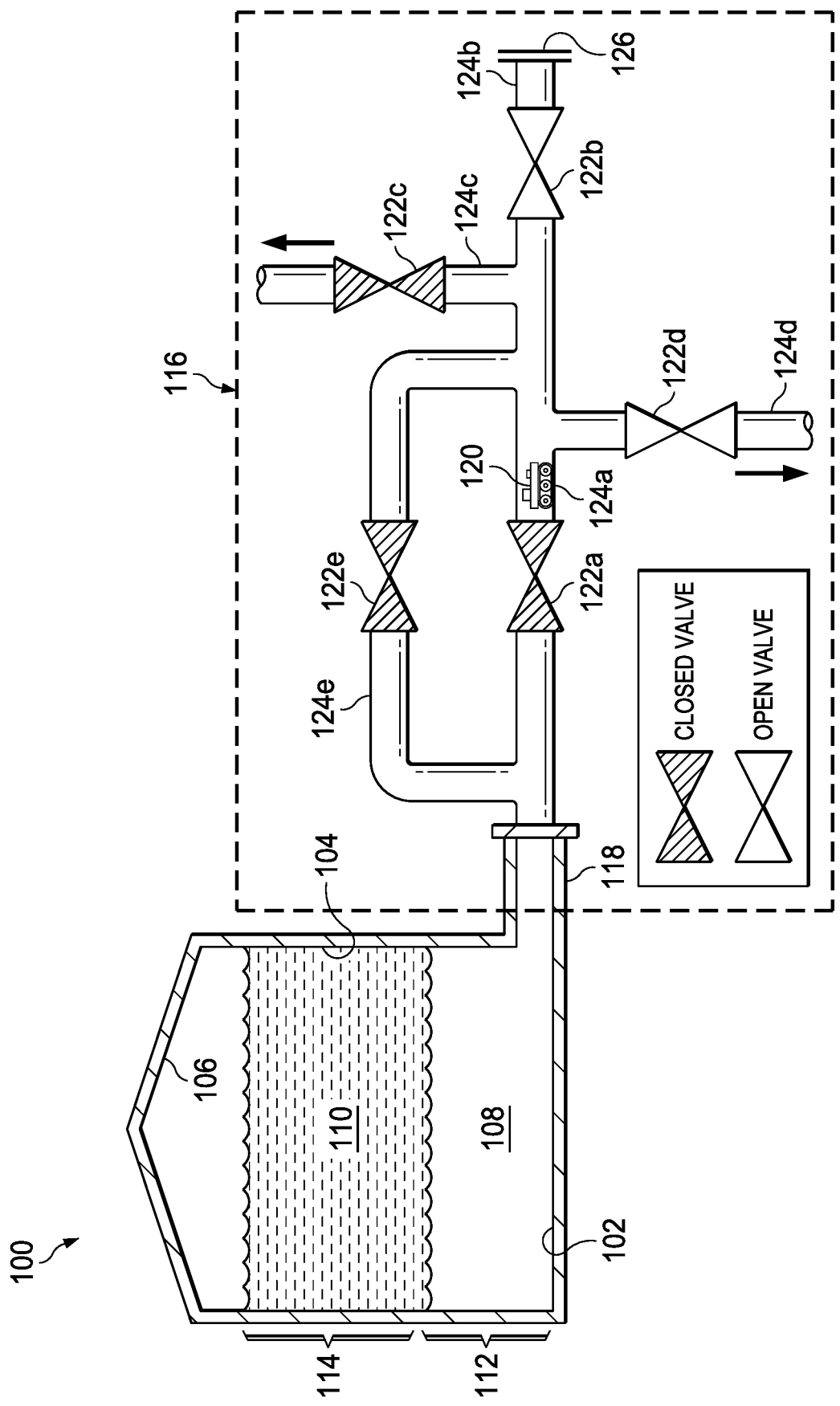

FIG. 2C shows a configuration in which the launch system 116 begins introducing the robotic tank inspection device 120 into the in-service tank 100. Typically, the launch system 116 includes an end blind cover 126 that covers an outlet of the fluid flow pathway 124b. In this configuration, an operator or the controller opens the blind cover 126 and places the robotic tank inspection device 120 at an end of the fluid flow pathway 124b. The operator can operate the robotic tank inspection device 120 or the robotic tank inspection device 120 can autonomously travel from the fluid flow pathway 124b towards the valve 122a and into the fluid-free fluid flow pathway 124a. Because the valve 122a is in a closed state, the robotic tank inspection device 120 cannot travel past the valve 122a towards the in-service tank 100. Also, in this configuration, the valves 122c and 122e remain in the closed state, whereas the valves 122b and 122d remain in the open state. Valve 122b shall be closed once the robotic tank inspection device 120 is positioned at the end of pathway 124b (nearest to valve 122a). Further, in this configuration, the pressure in the nozzle 118 upstream of the valve 122a is greater than the pressure in the fluid flow pathway 124a downstream of the valve 122a.

Figure 2D:
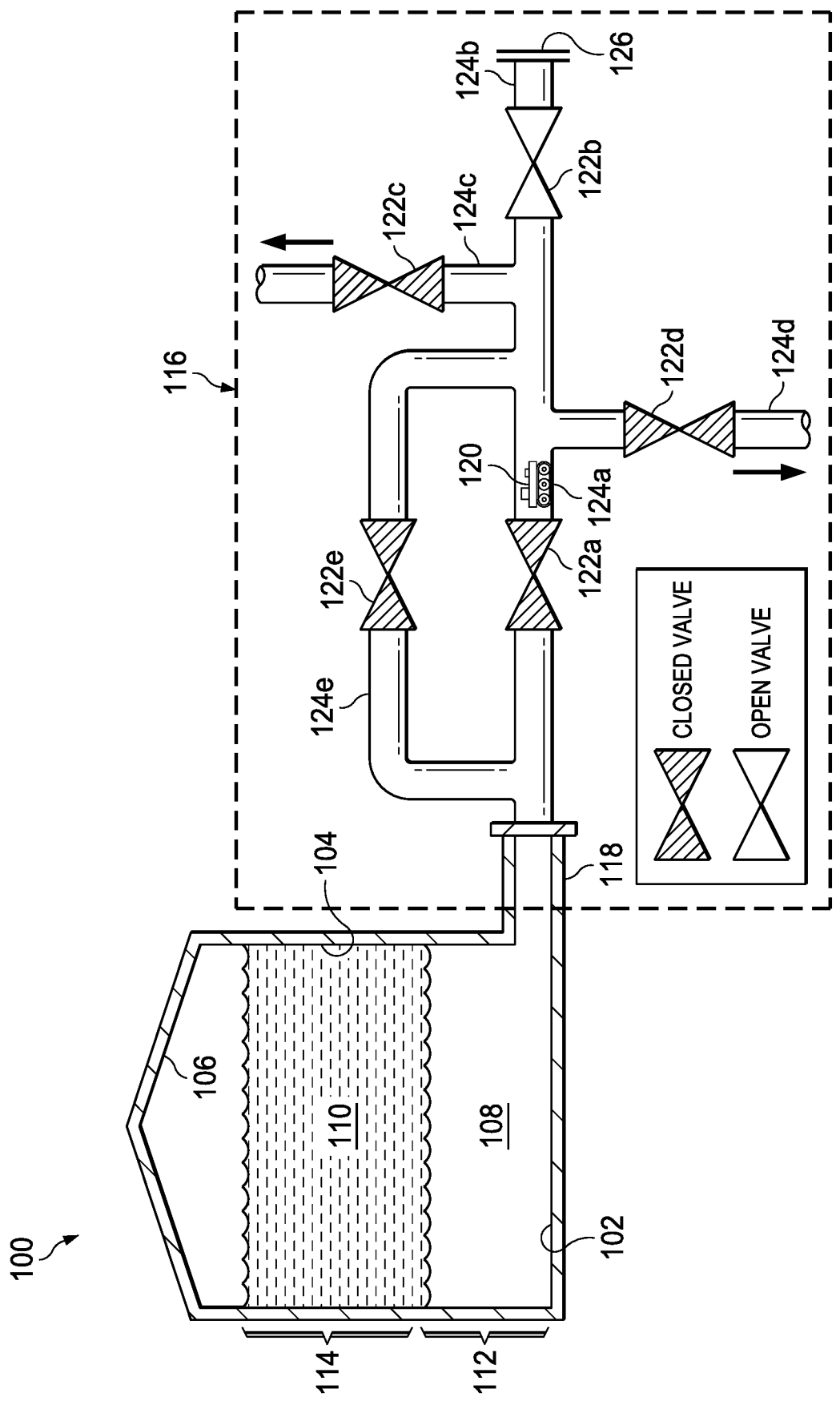

FIG. 2D shows a configuration in which the robotic tank inspection device 120 has been introduced into the fluid flow pathway 124a after removing the blind cover 126 and through the fluid flow pathway 124b. In this configuration, the robotic tank inspection device 120 is positioned in the fluid flow pathway between the valve 122a and the valve 122b. After the inspection device is positioned near valve 122a, valve 122b is closed. All the valves 122c, 122d, and 122e remain in the closed state.

Figure 2E:
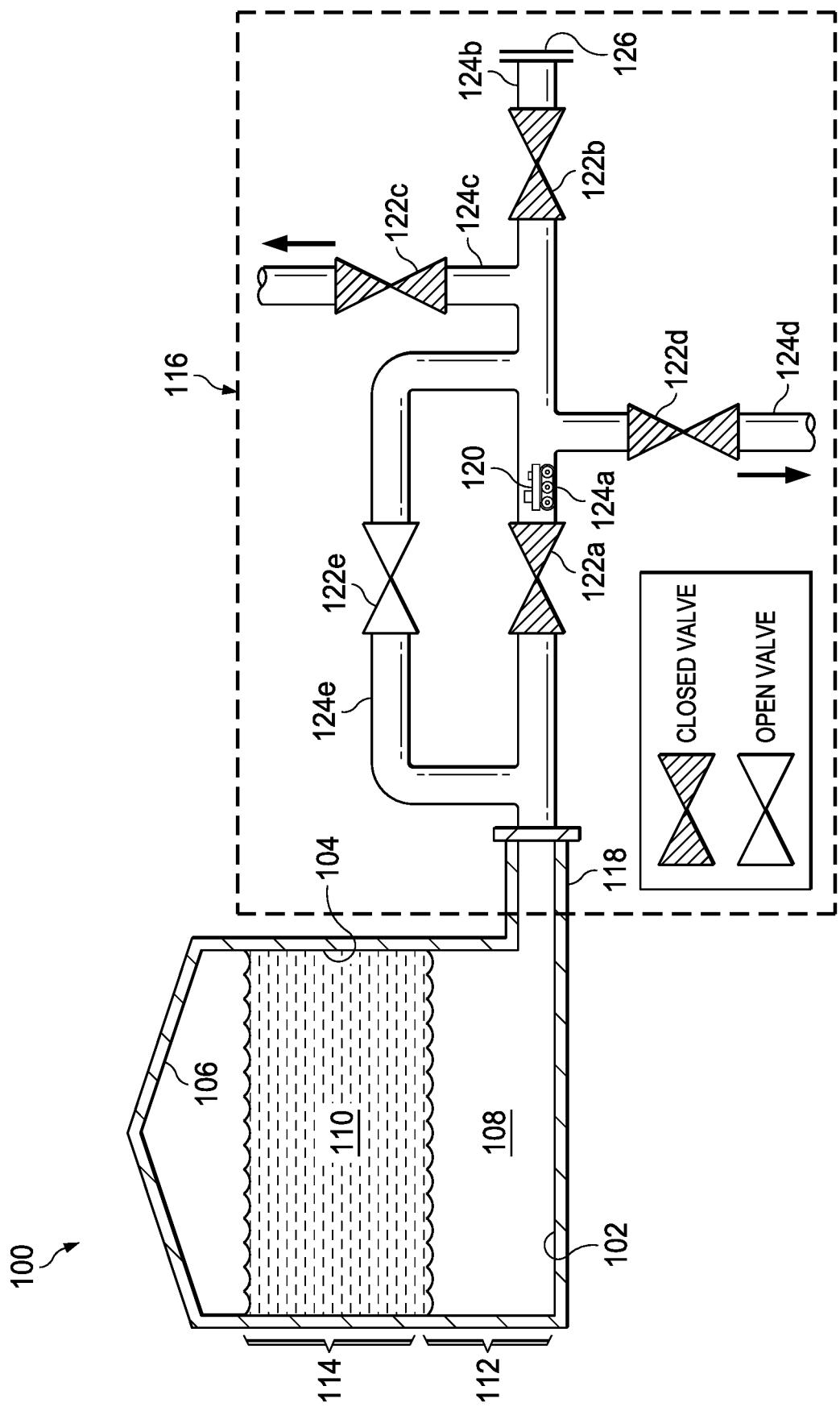

FIG. 2E shows a configuration in which the launch system 116 equalizes a pressure in the fluid flow pathway 124a and 124e. Pathway 124e serves as an equalization line to equalize the pressure across valve 122a. In this configuration, the valves 122a, 122b, 122c, and 122d remain in the closed state and the valve 122e is changed from the closed state to an open state. Consequently, the first fluid phase 108 flows from the in-service tank 100 through the nozzle 118 and into the fluid flow pathway 124e and 124c filling the fluid flow pathways between the closed valves 122a, 122b, 122c, and 122d. The introduction of the first fluid phase 108 into the fluid flow pathway 124a equalizes the fluid pressure on the robotic tank inspection device 120 and valve 122a. This makes the operation of valve 122a easier.

Figure 2F:
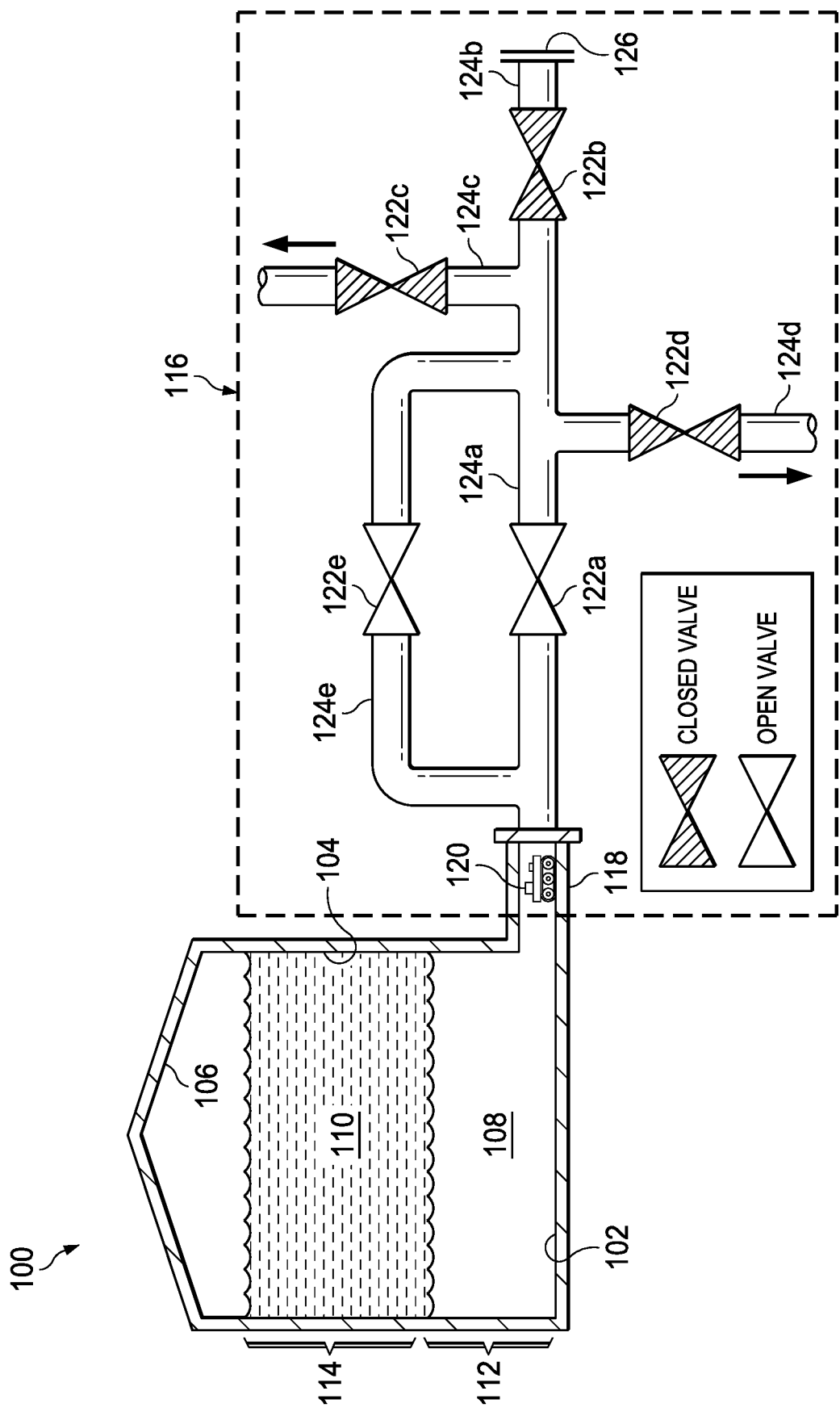

FIG. 2F shows a configuration in which the robotic tank inspection device 120 has been introduced into the nozzle 118 but is still outside the in-service tank 100. Because the fluid flow pathway 124a has been pressure-equalized as described earlier with reference to FIG. 2E, the robotic tank inspection device 120 experiences substantially uniform fluidic pressure while entering the nozzle 118 from the fluid flow pathway 124a. Subsequently, the robotic tank inspection device 120 can further be introduced into the internal volume of the in-service tank 100 for example on the internal bottom surface 102.

The inspection robot for tank inspection can be equipped with various inspection tools like high definition cameras for visual inspection of the tank components to check for any plate bulges, coating failures, sacrificial anodes inspection etc. Ultrasonic thickness monitoring devices or Magnetic Flux Leakage inspection devices can be mounted on the robot to perform the thickness of bottom plate. These non-destructive inspections along with the visual input from the cameras can help identify the exact damage location (internal or external surface of the bottom plate). Navigation for the robot could be pre-programmed as per tank as built drawings or it could be configured for remote operation.

Figure 2G:
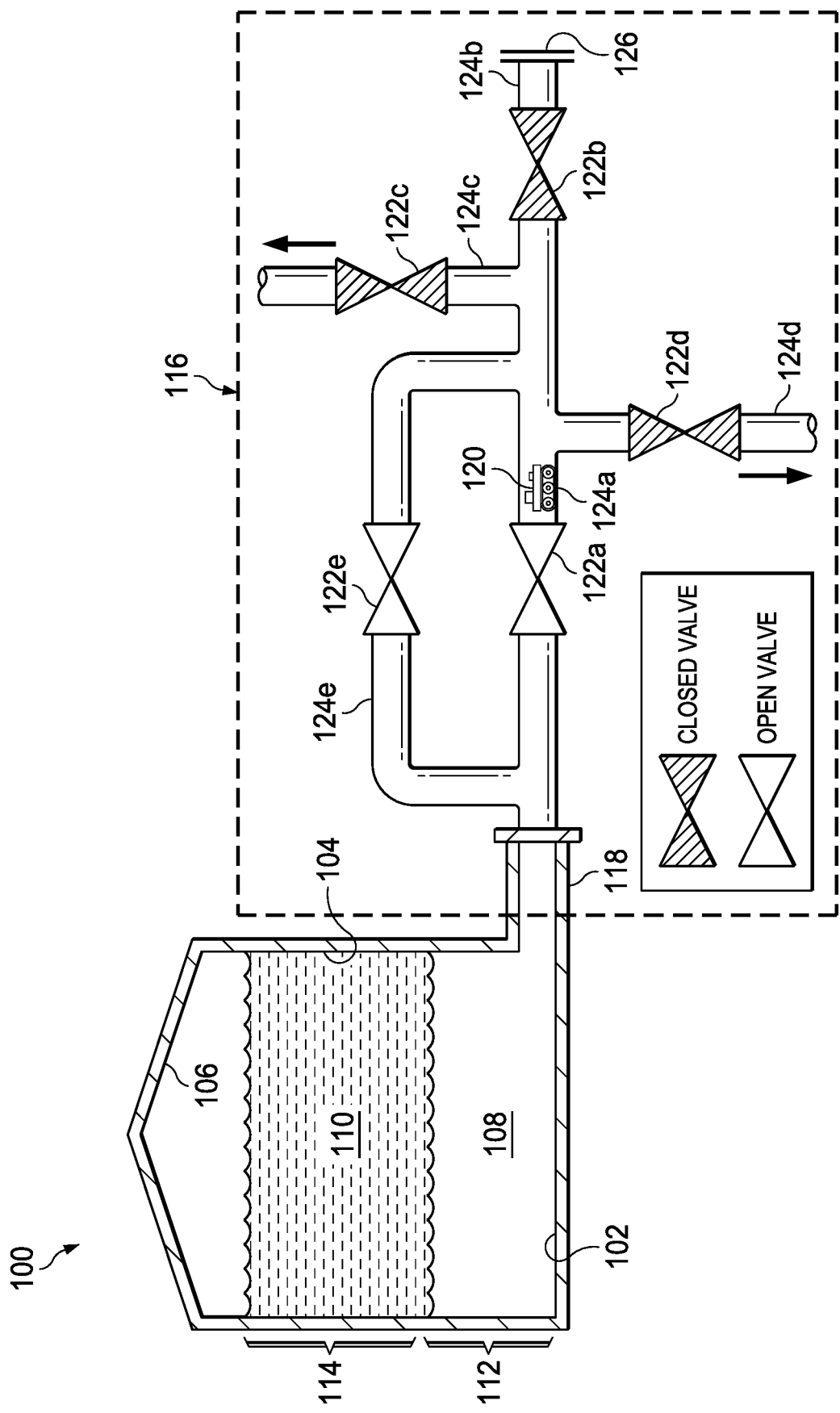

After the robotic tank inspection device 120 has completed the inspection operation, the robotic tank inspection device 120 can be retrieved (either by an operator or autonomously) from within the internal volume of the in-service tank 100. FIG. 2G shows a configuration in which the robotic tank inspection device 120 has exited the internal volume of the in-service tank 100 and has been introduced into the nozzle 118. The states (open or closed) of the valves in the configuration shown in FIG. 2G are identical to the states of the valves in the configuration shown in FIG. 2F. Consequently, the robotic tank inspection device 120 can travel away from the in-service tank 100 into the fluid flow pathway 124a.

Figure 2H:
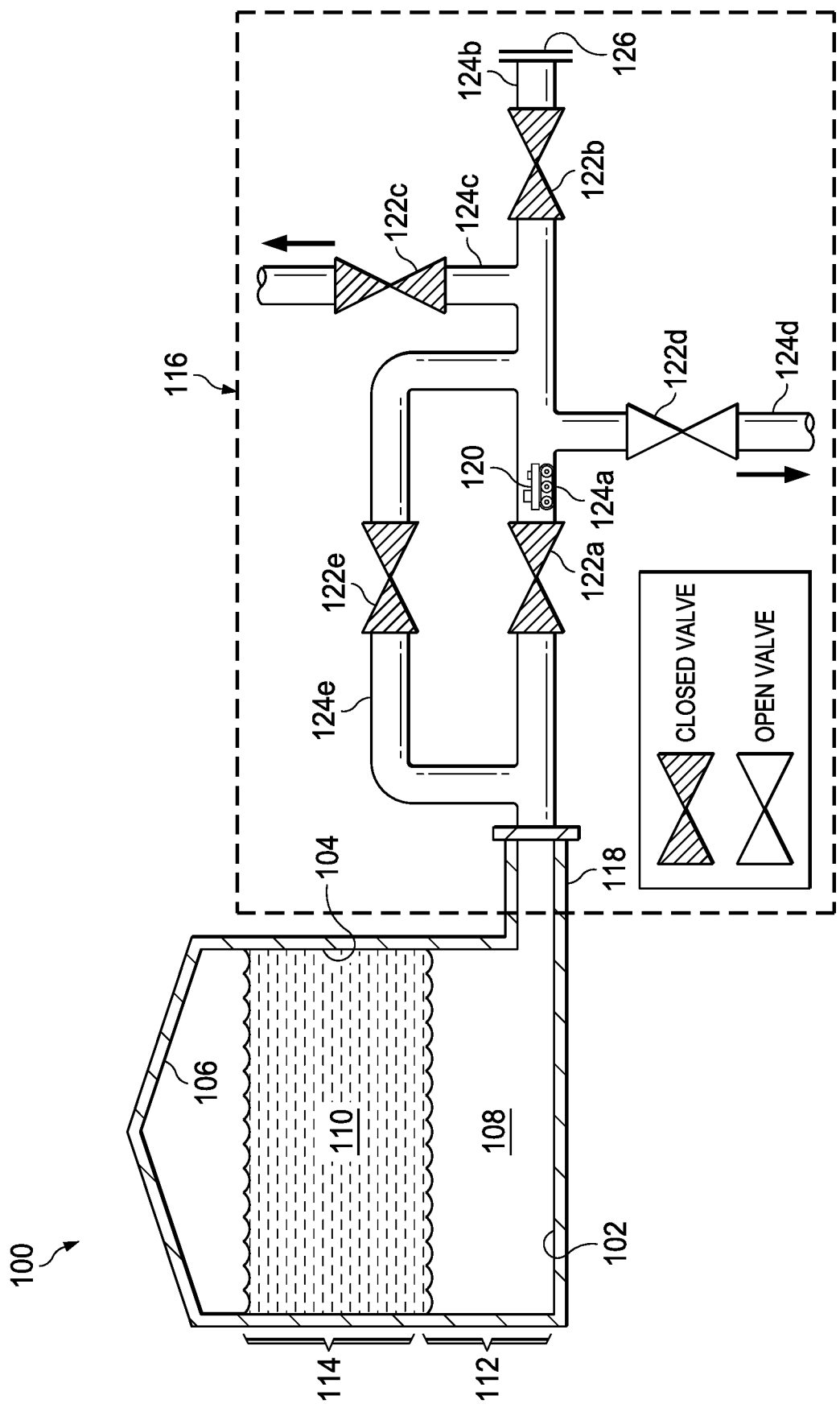

FIG. 2H shows a configuration in which the pressure in the fluid flow pathway 124a is equalized relative to atmospheric pressure. In this configuration, the valve 122a and the valve 122e are closed. The valve 122b and the valve 122c remain in the closed state. The valve 122d is then transitioned into the open state, allowing the first fluid phase 108 in the fluid flow pathway 124a to drain through the fluid flow pathway 124d. Consequently, the pressure within the fluid flow pathway 124a decreases to the atmospheric pressure.

Figure 2I:
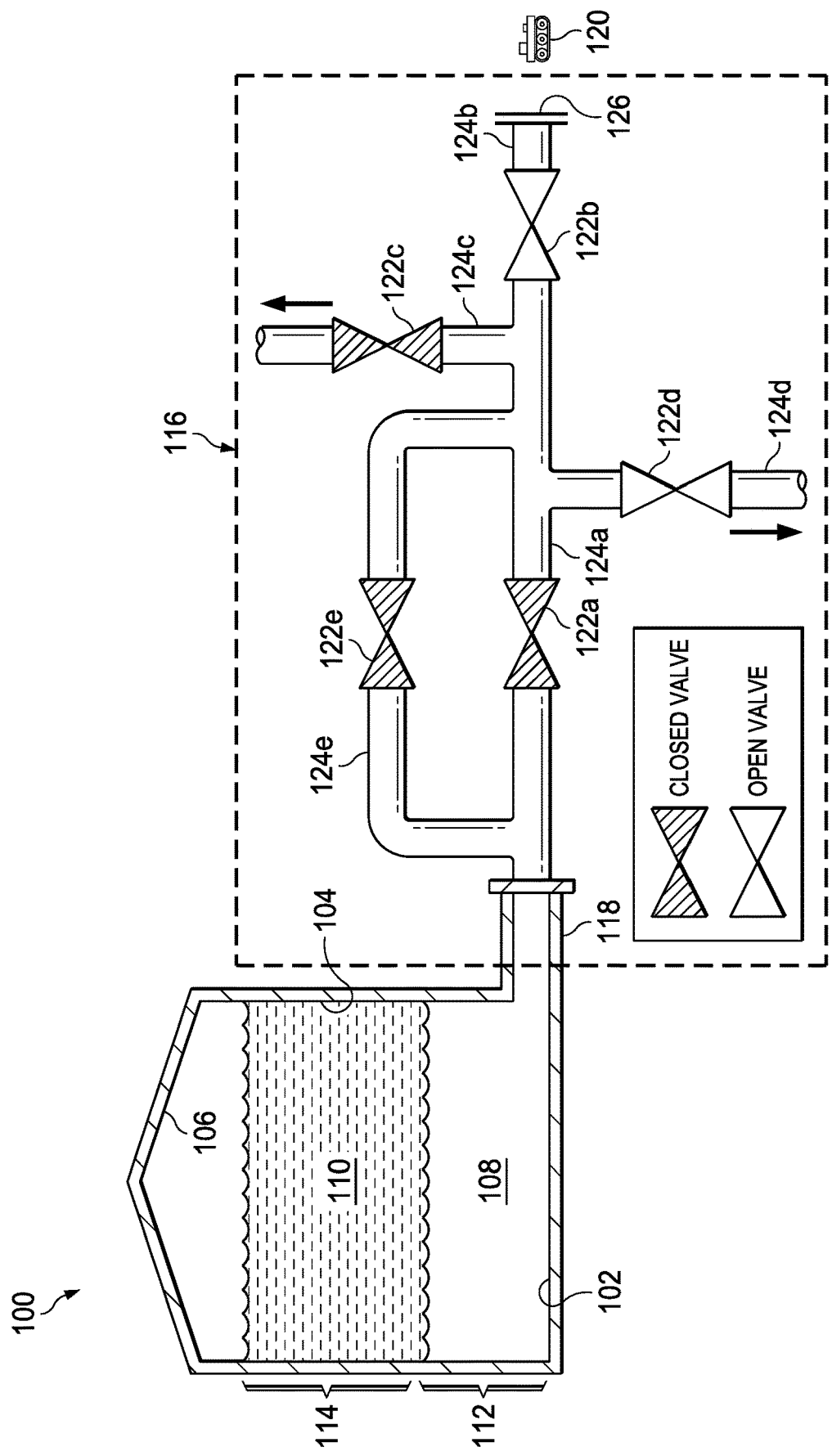

FIG. 2I shows a configuration in which the robotic tank inspection device 120 is retrieved from the launch system 116. In this configuration, the valve 122b and the valve 122d remain in the open state. However, no fluid flows through the fluid flow pathways connected to the valves 122b and 122d due to the absence of any fluid in them. The blind cover 126 is opened and the robotic tank inspection device 120 is operated to travel through the fluid flow pathway 124a, past the valve 122b, and through the fluid flow pathway 124b to exit the launch system 116.

Figure 2J:
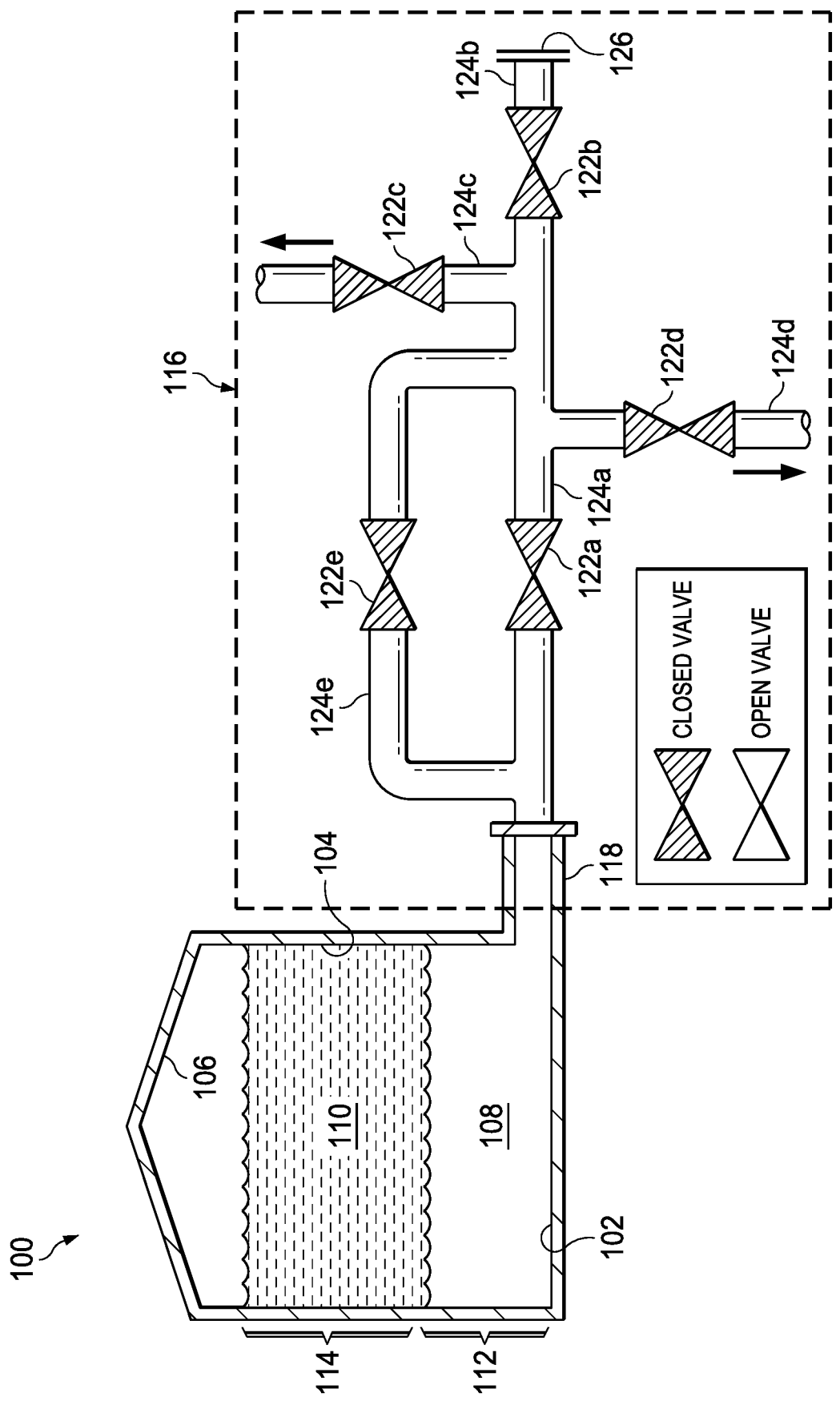
Figure 2K:
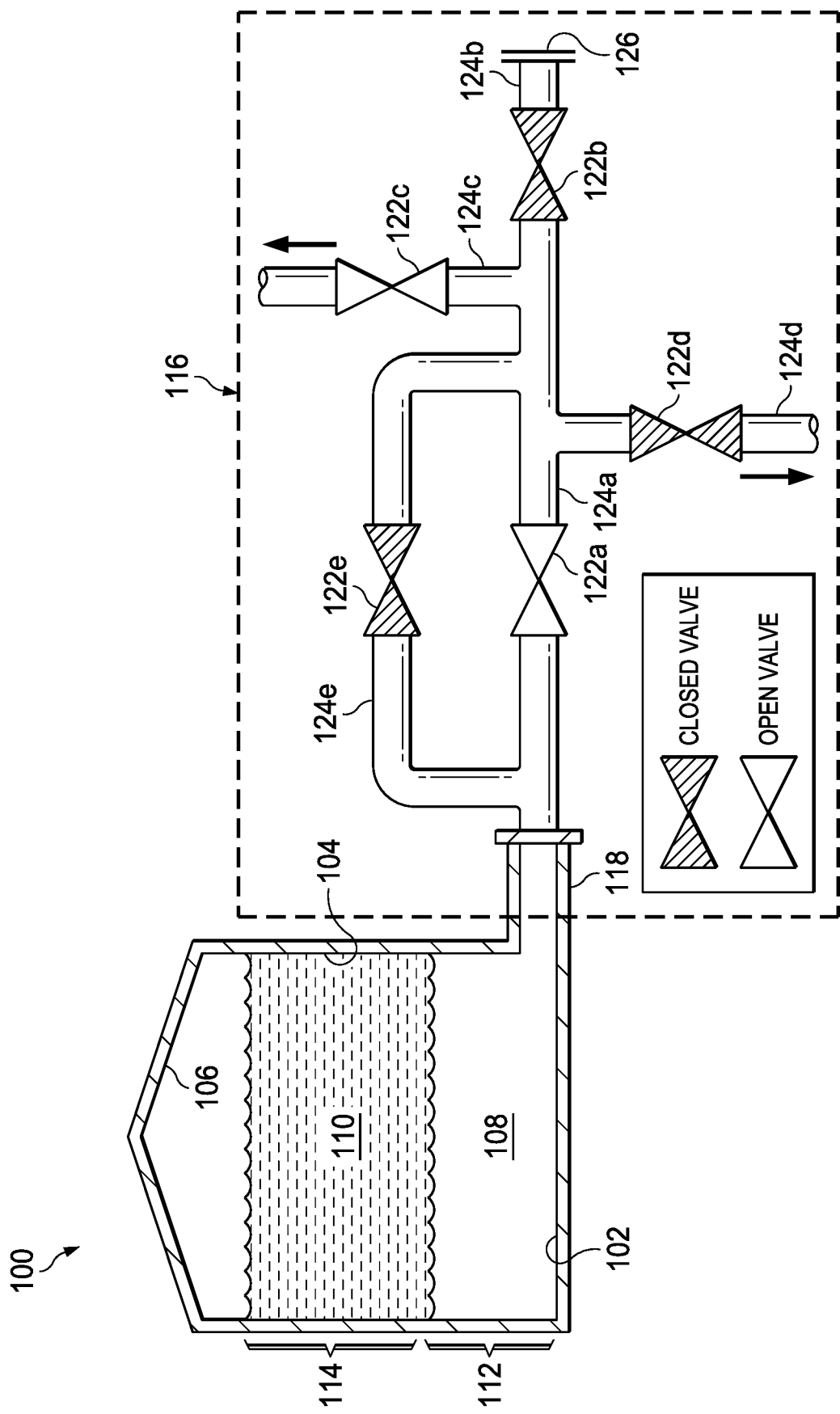

FIG. 2J shows a configuration in which the launch system 116 is closed. In this configuration, all the valves are in the closed state. FIG. 2K shows a configuration in which flow of the first fluid phase 108 out of the in-service tank 100 resumes. In this configuration, the valves 122a and 122c are opened while the remaining valves remain in the closed state. The first fluid phase 108 exits the internal volume of the in-service tank 100 and flows into the fluid flow pathway 124a and the fluid flow pathway 124b through the nozzle 118. The first fluid phase 108 continues to flow past the valve 122a into the fluid flow pathway 124a, into the fluid flow pathway 124c, past the valve 122c and towards the outlet. The configuration shown in FIG. 2K is identical to the configuration shown in FIG. 2A, indicating that the in-service tank 100 has been returned to the normal operational configuration. In some implementations, a double block and bleed arrangement can be implemented in the fluid flow pathway 124b near the valve 122b for additional safety and to counter possible valve passing.

Figure 3:
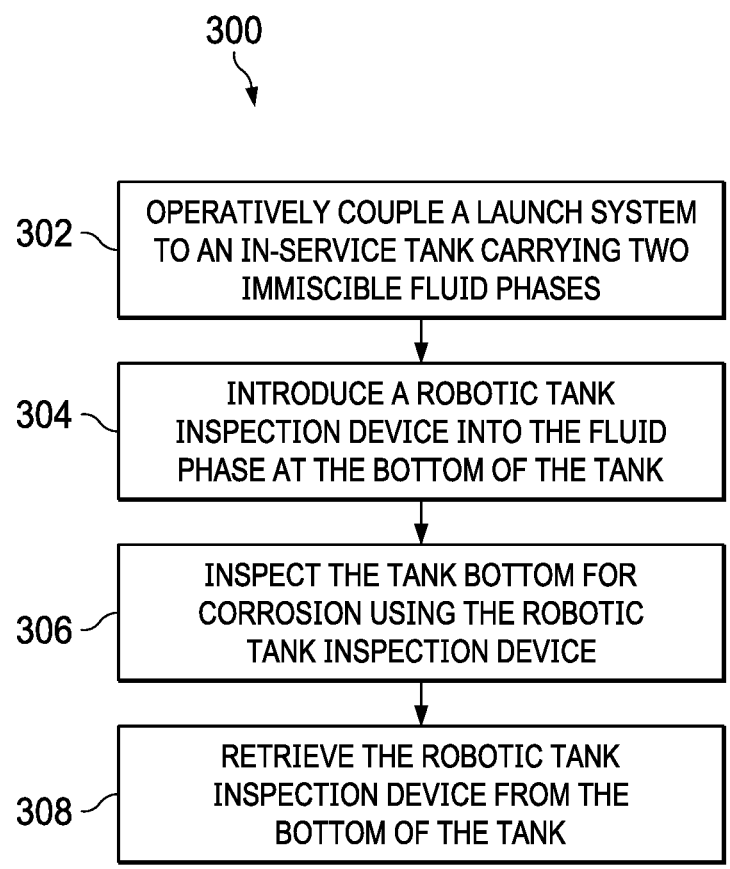
FIG. 3 is a flowchart of an example of a process for deploying the robotic tank inspection device into the in-service tank.

FIG. 3 is a flowchart of an example of a process 300 for deploying the robotic tank inspection device into the in-service tank. At 302, a launch system including multiple valves is operatively coupled to an in-service tank carrying a multiphase fluid separated into a first fluid phase settled at the bottom of the in-service tank and a second fluid phase floating above the first fluid phase. The launch system is coupled to the bottom of the in-service tank. At 304, a robotic tank inspection device is introduced into the first fluid phase in the in-service tank while bypassing the second fluid phase. At 306, the robotic tank inspection device is operated to inspect the bottom of the in-service tank for corrosion. At 308, the robotic tank inspection device is retrieved from the bottom of the in-service tank. At all times during the implementation of the process 300, contact between the robotic tank inspection device and the second fluid phase floating above the first fluid phase is avoided.

Figure 4:
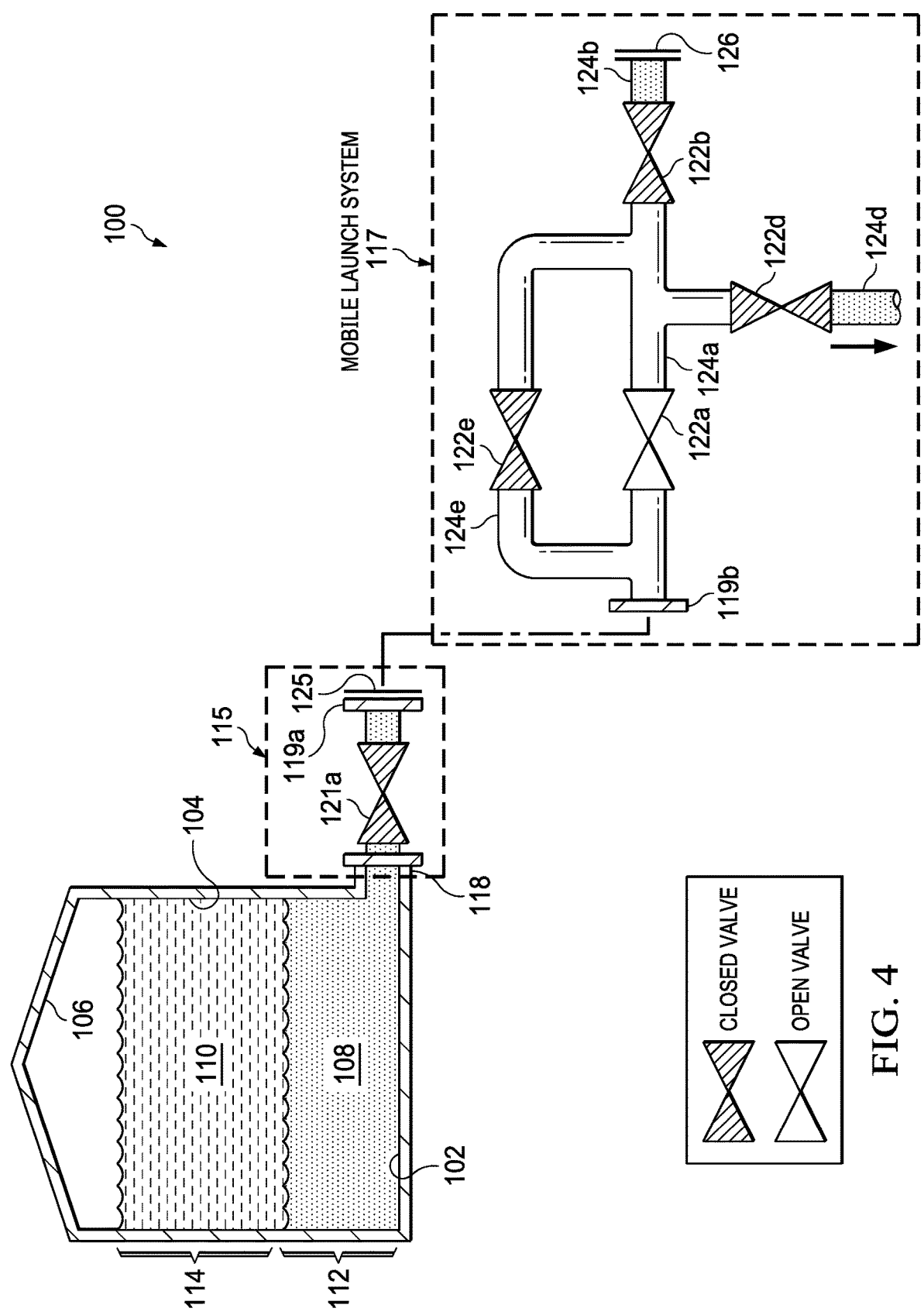
FIG. 4 is a schematic drawing of a mobile robotic tank inspection device launching system.

FIG. 4 is a schematic drawing of a mobile robotic tank inspection device launching system 117. In case the storage tank 100 does not have a suitable fixed outlet piping network of the valves required for the launch system 116 (FIG. 1A), a mobile launch system 117 can be attached instead to the tank through nozzle 119a. In such implementations, an isolation valve 121a and an end blind 125 are included with the tank 100 at nozzle 118. This assembly is noted as 115 in FIG. 4. The mobile launch system 117 can be attached to the tank whenever robotic inspection of tank bottom 102 is required. Compared to the launch system 116, the mobile launch system 117 does not have the valve 122c and pathway 124c as it shall not be used as an outlet piping.

A typical configuration for the isolation valve 121a and end blind cover 125 (assembly 115) and its connection to mobile launching system 117 is given in FIG. 4. The mobile launch system 117 can be attached to any tank which has an isolation arrangement 115 attached to a side wall 104 nozzle. To connect the tank to mobile launch system 117, end cover blind 125 shall be removed and mobile launch system shall be connected to the tank using nozzles 119a and 119b. Valve 121a shall be opened to connect the tank 100 with the mobile launch system 117 and allow the fluid in the tank to flow out into the mobile launch system 117 pipeways. The remaining operation sequence is same as given in FIG. 2A-2K. To disconnect the mobile launch system, valve 121a shall be closed. Then, the mobile launch system 117 shall be disengaged from nozzle 119a and removed from site.

Finally, end blind cover 125 may be installed back to complete the isolation of tank 100.

Certain implementations have been described in this disclosure, with reference to oil or similar hydrocarbons as the second fluid phase and water as the first fluid phase. The techniques described in this disclosure can also be implemented for other types of immiscible fluid phases in a multiphase fluid. In general, the techniques can be implemented in any in-service tank. Also, certain implementations have been described in which the robotic tank inspection device is introduced into the internal volume of the tank from the very bottom of the tank. In some implementations, the inlet to the tank (for example, the nozzle 118) can be offset from and vertically above the internal bottom surface of the tank. That said, the inlet is entirely surrounded by the first fluid phase so that the robotic tank inspection device does not come into physical contact with the second fluid phase when introduced into the tank through the inlet.

Thus, particular implementations of the subject matter have been described. Other implementations are within the scope of the following claims.

The invention claimed is:

1. A method comprising:
operatively coupling a launch system comprising a plurality of valves to an in-service tank carrying a multiphase fluid separated into a first fluid phase settled at a bottom of the in-service tank and a second fluid phase floating above the first fluid phase, the launch system coupled to the bottom of the in-service tank;
by operating the launch system, introducing a robotic tank inspection device into the first fluid phase in the in-service tank while bypassing the second fluid phase; and
by operating the robotic tank inspection device, inspecting the bottom of the in-service tank for corrosion,
wherein the first fluid phase occupies a volume within the in-service tank,
wherein the robotic tank inspection device is introduced directly into the volume occupied by the first fluid phase while avoiding a remaining volume within the in-service tank,
wherein the launch system comprises a nozzle attached to the bottom of the in-service tank, the nozzle directly coupled to the volume occupied by the first fluid phase, wherein the robotic tank inspection device is introduced directly into the volume through the nozzle,
wherein the launch system comprises a plurality of flow pathways fluidically coupled to the plurality of valves, wherein the robotic tank inspection device is introduced into the first fluid phase through the nozzle by operating the plurality of valves to regulate fluid flow through the plurality of flow pathways, wherein the plurality of flow pathways comprises:
two main pathways coupled to two main valves sized to allow the robotic tank inspection device to enter the in-service tank,
an equalization flow pathway parallel to the two main pathways to equalize pressure across the valve,
a drain flow pathway to remove fluid from one of the two main pathways, and
a pathway to take the in-service tank back to service after the robotic tank inspection device has completed inspecting the in-service tank.

2. The method of claim 1, wherein avoiding the remaining volume of the in-service tank comprises avoiding contact between the robotic tank inspection device and the second fluid phase when introducing the robotic tank inspection device into the first fluid phase.

3. The method of claim 1, wherein inspecting, by operating the robotic tank inspection device, the bottom of the in-service tank comprises inspecting the bottom of the in-service tank while avoiding contact between the robotic tank inspection device and the second fluid phase.

4. The method of claim 1, further comprising, by operating the launch system, retrieving the robotic tank inspection device from the in-service tank from the first fluid phase while bypassing the second fluid phase.

5. The method of claim 4, wherein retrieving the robotic tank inspection device comprises avoiding contact between the robotic tank inspection device and the second fluid phase.

6. A method comprising:
storing a multiphase fluid in an in-service tank comprising an internal bottom surface, the multiphase fluid comprising a non-flammable first fluid phase and a flammable second fluid phase immiscible with the first fluid phase, wherein the first fluid phase settles to the internal bottom surface of the in-service tank;
introducing a robotic tank inspection device directly into a portion within the in-service tank in which the first fluid phase and no second fluid phase resides;
autonomously inspecting, by the robotic tank inspection device, the internal bottom surface for corrosion while residing in the portion of the in-service tank; and
fluidically coupling a launch system comprising a nozzle, a plurality of flow pathways fluidically coupled to the nozzle, and a plurality of valves to regulate fluid flow through the plurality of flow pathways to the portion of the in-service tank,
wherein the robotic tank inspection device is introduced directly into the portion through the nozzle,
wherein the launch system comprises a plurality of flow pathways fluidically coupled to the plurality of valves,
wherein the robotic tank inspection device is introduced into the first fluid phase through the nozzle by operating the plurality of valves to regulate fluid flow through the plurality of flow pathways, wherein the plurality of flow pathways comprises:
two main pathways coupled to two main valves sized to allow the robotic tank inspection device to enter the in-service tank,
an equalization flow pathway parallel to the two main pathways to equalize pressure across the valve,
a drain flow pathway to remove fluid from one of the two main pathways, and
a pathway to take the in-service tank back to service after the robotic tank inspection device has completed inspecting the in-service tank.

7. The method of claim 6, wherein a side wall connects the internal bottom surface of the in-service tank to a roof of the in-service tank, wherein the nozzle is coupled to the side wall nearer to the internal bottom surface than to the roof.

8. The method of claim 7, wherein a portion of the nozzle extending within the in-service tank resides entirely within the first fluid phase.

9. The method of claim 6, wherein contact between the robotic tank inspection device and the second fluid phase is avoided when introducing the robotic tank inspection device into the in-service tank.

10. The method of claim 9, wherein the contact is avoided when the robotic tank inspection device autonomously inspects the in-service tank bottom.

11. The method of claim 9, further comprising, after completion of inspection, retrieving the robotic tank inspection device from within the in-service tank, wherein the contact is avoided when retrieving the robotic tank inspection device.

12. A method comprising:

in an in-service tank comprising an internal bottom surface, a side wall and a roof, the in-service tank carrying a first fluid phase and a second fluid phase immiscible with the first fluid phase, the in-service tank defining an internal volume comprising a first volume portion nearer the internal bottom surface than the roof and a second volume portion nearer the roof than the internal bottom surface, the first fluid phase and no second fluid phase occupying the first volume portion, the second fluid phase and no first fluid phase occupying the second volume portion:

introducing a robotic tank inspection device directly into the first volume portion while avoiding the second volume portion;

operating the robotic tank inspection device in the first volume portion to inspect the internal bottom surface for corrosion; and fluidically coupling a launch system comprising a nozzle, a plurality of flow pathways fluidically coupled to the nozzle, and a plurality of valves to regulate fluid flow through the plurality of flow pathways to the portion of the in-service tank, wherein the robotic tank inspection device is introduced directly into the portion through the nozzle, wherein the launch system comprises a plurality of flow pathways fluidically coupled to the plurality of valves, wherein the robotic tank inspection device is introduced into the first fluid phase through the nozzle by operating the plurality of valves to regulate fluid flow through the plurality of flow pathways, wherein the plurality of flow pathways comprises:

two main pathways coupled to two main valves sized to allow the robotic tank inspection device to enter the in-service tank, an equalization flow pathway parallel to the two main pathways to equalize pressure across the valve, a drain flow pathway to remove fluid from one of the two main pathways, and a pathway to take the in-service tank back to service after the robotic tank inspection device has completed inspecting the in-service tank.

13. The method of claim 12, wherein introducing the robotic tank inspection device directly into the first volume portion comprises preventing contact between the second fluid phase and the robotic tank inspection device.

14. The method of claim 12, wherein operating the robotic tank inspection device in the first volume portion comprises preventing contact between the second fluid phase and the robotic tank inspection device.

15. The method of claim 12, further comprising, after completion of inspection, retrieving the robotic tank inspection device from within the in-service tank while avoiding the second volume portion.

16. The method of claim 15, wherein retrieving the robotic tank inspection device comprises preventing contact between the second fluid phase and the robotic tank inspection device.

* * * * *